Sept. 22, 1925.
F. G. ADAMS
1,554,396
BAND BRAKE FOR AUTOMOTIVE VEHICLES
Filed April 18, 1923
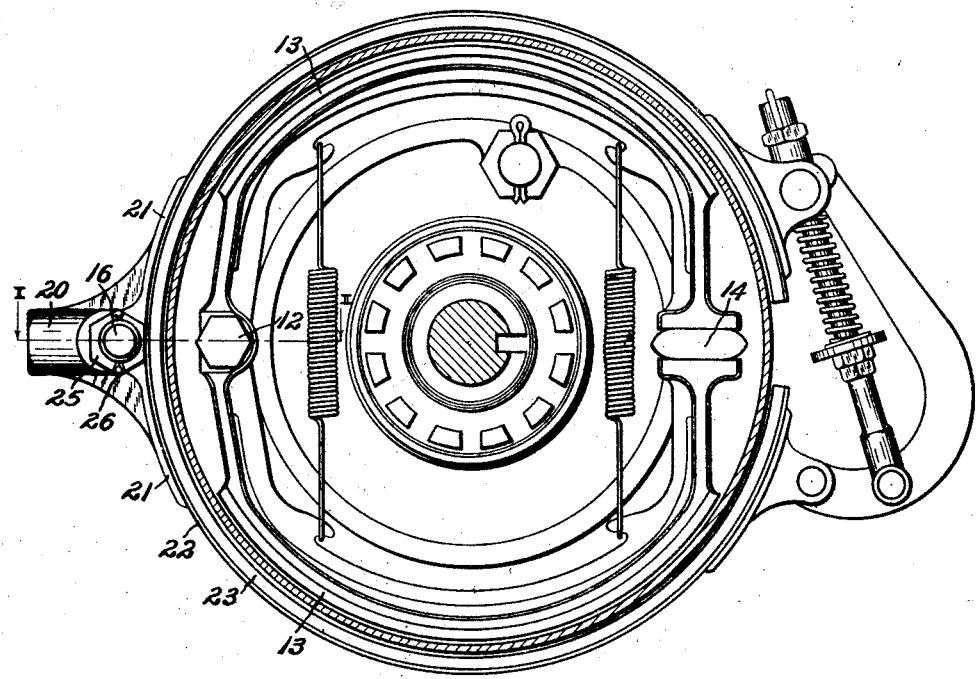
Fig. I.
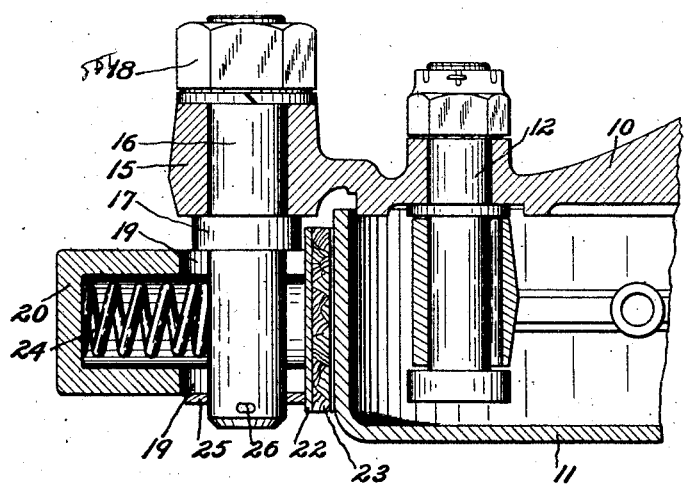
Fig. II.
INVENTOR.
Fred G. Adams.
BY Solon J. Boughton
ATTORNEY.

Patented Sept. 22, 1925.

1,554,396

UNITED STATES PATENT OFFICE.

FRED G. ADAMS, OF TORONTO, ONTARIO, CANADA, ASSIGNOR TO WILLYS-OVERLAND LIMITED, OF TORONTO, CANADA, A CORPORATION OF ONTARIO.

BAND BRAKE FOR AUTOMOTIVE VEHICLES.

Application filed April 18, 1923. Serial No. 632,959.

*To all whom it may concern:*

Be it known that I, FRED G. ADAMS, a subject of the King of Great Britain, residing at Toronto, in the Province of Ontario and Dominion of Canada, have invented certain new and useful Improvements in Band Brakes for Automotive Vehicles, of which I declare the following to be a full, clear, and exact description.

This invention relates to improvements in band brakes for automotive vehicles and has reference particularly to the means for adjustment of the brake band at the point where it is anchored.

One of the objects of the invention is the provision of a simple and cheap means for regulating the distance between the brake drum and brake band at the point of anchorage of the latter during the normal operation of the vehicle, that is, when the brake is not applied.

Other objects, and objects relating to details of construction and economies of manufacture, will appear as I proceed with the description of that embodiment of the invention, which, for the purposes of the present application, I have illustrated in the accompanying drawing, in which:

Figure I is an elevational view of a brake mechanism mounted upon the axle of an automotive vehicle, with the brake drum broken away, showing the mechanism of the internal expanding brake.

Fig. II is a transverse sectional view taken on the line II—II, Fig. I, and showing my adjustable stop for controlling the normal spacing of the brake drum and brake band at the point where the latter is anchored.

In the drawing, 10 represents a plate fixed upon the axle housing. This plate serves primarily as the support upon which both the internal and external brake sectors are mounted. It is also utilized, however, as a cover for the space otherwise enclosed by the brake drum 11.

12 is an anchor bolt upon which the internal brake sectors 13 are pivoted, these sectors being adapted to be expanded against the internal periphery of the brake drum by means of a cam 14. The internal brake mechanism illustrated is of a form now in common use, however, and constitutes no part of my present invention.

At the rear of the plate 10 there is an extension 15 bored to receive a bolt 16, which is held in position against endwise movement in either direction by a collar 17 integral with the bolt, and a nut 18, said collar and nut bearing upon opposite sides of the extension 15. The protruding portion of the bolt is smooth and extends through slots 19 in opposite sides of a housing 20 provided with wings 21 secured to the outer metal portion 22 of the brake band. The fabric lining 23 of the latter, is fastened to the metal portion by rivets or other means well known in the art. The slots 19 are elongated in a horizontal direction, but are wide enough only to provide an easy sliding fit upon the bolt 16. Within the housing is a coil spring 24 bearing at one end upon the bolt 16 and tending to force the housing 20 with its wings 21, and consequently the brake band, outwardly away from the brake drum.

Now, in order to maintain the brake band in its position of rest as close to the brake drum as possible, without causing the band to drag upon the drum, it is desirable to provide an adjustable stop which will prevent the spring 24 from withdrawing the band beyond a predetermined distance. Various means have been devised to accomplish this purpose, but by my present invention, I have simplified earlier constructions by the use merely of a polygonal washer 25 having the hole therethrough eccentrically positioned, as shown best in Fig. I, so that the rotation of the washer will present any one of a plurality of edge surfaces for contact by the brake band, such surfaces being thus located at varying distances from the center of the fixed bolt 16, making possible a number of different adjustments equal to the number of edge surfaces upon the washer.

Various means may be employed to prevent movement of the washer 25 lengthwise upon the bolt 16, the one illustrated consisting merely of a cotter pin 26 projected through a hole in the end of the bolt.

While I have shown and described in some detail, one form which my invention may assume in practice, it is to be understood that the showing and description are for purposes of illustration only, and that I do not regard the invention as limited to the precise details of construction illustrated or described, except insofar as I have included such limitations within the terms of the following claims.

I claim:

1. In external band brake mechanism, a brake drum, a relatively fixed pin, a brake band supported thereon but capable of motion with respect thereto toward and away from the said brake drum, resilient means tending to move the brake band away from said drum, and a polygonal disk mounted on said pin eccentrically and capable of rotation thereon, the edge faces of said disk being adapted to engage the brake band to limit its movement away from the drum.

2. In combination, a brake drum, a relatively fixed pin, an external brake band support comprising an elongated bearing slidable upon said pin toward and away from the drum, a spring bearing upon said pin and support tending to move the latter away from said drum, and a disk rotatable upon said pin, said disk having a plurality of edge faces at different distances from the center of said pin, each face adapted to bear against said brake band to limit the motion of the latter away from said drum.

3. In combination, a brake drum, a relatively fixed pin, a brake band, a brake band support slidable upon said pin, means tending to move the said brake band support relative to said pin, and a disc eccentrically mounted to rotate upon said pin and adapted to limit the movement of said brake band in one direction.

4. In combination, a brake drum, a brake band, a relatively fixed abutment, a brake band support mounted upon said brake band and adapted to movably engage said abutment, resilient means interposed between said support and abutment tending to separate said brake band from said brake drum, and adjustable means for limiting the extent of said separation, said adjustable means comprising a disc eccentrically mounted for rotation.

In testimony whereof, I affix my signature.

FRED G. ADAMS.